United States Patent
Harrick

(10) Patent No.: US 9,244,185 B2
(45) Date of Patent: Jan. 26, 2016

(54) SYSTEM AND METHOD FOR TOWED MARINE GEOPHYSICAL EQUIPMENT

(71) Applicant: PGS Geophysical AS, Lysaker (NO)

(72) Inventor: Bruce William Harrick, Cypress, TX (US)

(73) Assignee: PGS Geophysical AS, Oslo (NO)

(*) Notice: Subject to any disclaimer, the term of this patent is extended or adjusted under 35 U.S.C. 154(b) by 138 days.

(21) Appl. No.: 13/944,396

(22) Filed: Jul. 17, 2013

(65) Prior Publication Data

US 2013/0301385 A1 Nov. 14, 2013

Related U.S. Application Data

(62) Division of application No. 12/798,110, filed on Mar. 30, 2010, now abandoned.

(60) Provisional application No. 61/215,138, filed on May 1, 2009.

(51) Int. Cl.
*G01V 1/38* (2006.01)
*B08B 17/02* (2006.01)
*G01V 1/20* (2006.01)

(52) U.S. Cl.
CPC . *G01V 1/38* (2013.01); *B08B 17/02* (2013.01); *G01V 1/201* (2013.01)

(58) Field of Classification Search
CPC ................................. G01V 1/201; B08B 17/02
USPC .......................................... 367/15; 405/211.1
See application file for complete search history.

(56) References Cited

U.S. PATENT DOCUMENTS

| | | | |
|---|---|---|---|
| 4,092,858 A | 6/1978 | Edgerton | |
| 4,481,611 A | 11/1984 | Burrage | |
| 4,751,113 A | 6/1988 | Riccio et al. | |
| 4,984,218 A | 1/1991 | Ritter et al. | |
| 5,228,005 A | 7/1993 | Bjelland | |
| 5,302,414 A | 4/1994 | Alkhimov et al. | |
| H1490 H * | 9/1995 | Thompson et al. | 367/15 |
| 5,532,980 A | 7/1996 | Zarate et al. | |
| 5,735,226 A | 4/1998 | McNeal | |
| 6,009,042 A | 12/1999 | Workman et al. | |
| 7,022,750 B2 | 4/2006 | Camp et al. | |
| 7,211,173 B1 | 5/2007 | Staerzl et | |

(Continued)

FOREIGN PATENT DOCUMENTS

| | | |
|---|---|---|
| EP | 0465172 A1 | 1/1992 |
| GB | 2394479 B | 4/2004 |

(Continued)

OTHER PUBLICATIONS

P.J. Baum, Go-Faster Strips, Stripes, Riblets, etc.: Speedskating Drag Reduction and the 'Lost Dutchman Olympic Gold Mine' Speedskating Santa Barbara, Feb. 14, 1998.

(Continued)

*Primary Examiner* — Daniel L Murphy

(57) ABSTRACT

A system comprises towed marine geophysical equipment, adapted for towing through a body of water; and a surface covering, comprising a textural attribute of shark skin, attached to the marine geophysical equipment. A method comprises towing marine geophysical equipment having a surface covering, comprising a textural attribute of shark skin, attached thereto.

18 Claims, 5 Drawing Sheets

(56) References Cited

U.S. PATENT DOCUMENTS

| | | |
|---|---|---|
| 7,487,840 B2 | 2/2009 | Gammage et al. |
| 7,835,222 B2 | 11/2010 | Lobe et al. |
| 8,091,647 B2 | 1/2012 | Nicholson |
| 2006/0090593 A1 | 5/2006 | Liu |
| 2006/0144286 A1 | 7/2006 | Baum |
| 2006/0203613 A1 | 9/2006 | Thomsen et al. |
| 2007/0141114 A1* | 6/2007 | Muisener ............ C09D 5/1693 424/427 |
| 2007/0201307 A1 | 8/2007 | Lobe et al. |
| 2007/0227428 A1* | 10/2007 | Brennan et al. ............ 114/67 R |
| 2008/0192569 A1 | 8/2008 | Ray et al. |
| 2009/0097356 A1 | 4/2009 | Haldorsen et al. |
| 2010/0020644 A1 | 1/2010 | Vignaux |
| 2010/0108813 A1 | 5/2010 | Lang |
| 2010/0269731 A1 | 10/2010 | Tofte Jespersen et al. |
| 2010/0278771 A1 | 11/2010 | Lobe et al. |
| 2011/0123477 A1 | 5/2011 | Mount et al. |
| 2011/0311769 A1 | 12/2011 | Chen et al. |
| 2012/0243370 A1 | 9/2012 | Vignaux |
| 2012/0250458 A1 | 10/2012 | Tonchia |
| 2012/0301423 A1 | 11/2012 | Chai et al. |
| 2012/0321809 A1 | 12/2012 | Hartshorne et al. |
| 2013/0039153 A1 | 2/2013 | Hartshorne et al. |

FOREIGN PATENT DOCUMENTS

| | | |
|---|---|---|
| WO | 8910947 A1 | 11/1989 |
| WO | 2008025538 | 3/2008 |
| WO | 2008121418 A1 | 10/2008 |

OTHER PUBLICATIONS

William H. Dresher, Ph.D, Copper in Third-Generation Antifoulants for Marine Coatings, www.copper.org. Sep. 2000.

J. Karthikeyan, Cold Spray Technology: International Status and USA Efforts, Barberton, Ohio, USA, ASB Industries Inc., Dec. 2004.

NASA Riblets for Stars & Stripes, Fact Sheets, www.nasa.gov, Oct. 1993.

Martha J. Heil, Shark-Inspired Boat Surface Materials Engineers Turn to Ferocious Fish for Nonstick Ship Coating, American Institute of Physics, www.aip.org, May 1, 2005.

Office Action for U.S. Appl. No. 12/798,110 dated Jan. 17, 2013.

Australian Government, Patent Examination Report No. 1; Date of issue: Dec. 9, 2013, pp. 1-5.

D.W. Bechert, M. Bruse, W. Hage, R. Meyer, Fluid Mechanics of Biological Surfaces and Their Technological Application, Springer-Verlag 2000.

* cited by examiner

SYSTEM AND METHOD FOR TOWED MARINE GEOPHYSICAL EQUIPMENT

CROSS-REFERENCES TO RELATED APPLICATIONS

The present application is a divisional of U.S. patent application Ser. No. 12/798,110 filed on Mar. 30, 2010, which claims the benefit of U.S. Provisional Application No. 61/215,138 filed on May 1, 2009, the entire disclosures of which are incorporated herein by reference.

BACKGROUND OF THE INVENTION

1. Field of the Invention

This invention relates generally to the field of geophysical prospecting. More particularly, the invention relates to the field of marine geophysical surveys.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. Well-known techniques of geophysical prospecting include seismic and electromagnet surveys. The resulting geophysical data are processed to yield information relating to the geologic structure and properties of the subterranean formations in the area being surveyed.

In a marine seismic survey, seismic energy sources are used to generate a seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) and recorded.

The appropriate seismic sources for generating the seismic signal in marine seismic surveys typically include a submerged seismic source towed by a ship and periodically activated to generate an acoustic wavefield. The seismic source generating the wavefield is typically an air gun or a spatially-distributed array of air guns.

The appropriate types of seismic sensors typically include particle velocity sensors (typically, geophones) and water pressure sensors (typically, hydrophones) mounted within a towed seismic streamer (also know as a seismic cable). Seismic sensors are commonly deployed in sensor arrays within the streamer.

Seismic sources, seismic streamers, and other attached equipment are towed behind survey vessels, attached by cables. The seismic sources and seismic streamers may be positioned in the water by attached equipment, such as deflectors and cable positioning devices (also known as "birds").

Another technique of geophysical prospecting is an electromagnetic survey. Electromagnetic sources and receivers include electric sources plus magnetic sources and receivers. The electric and magnetic receivers can include multi-component receivers to detect horizontal and vertical electric signal components and horizontal and vertical magnetic signal components. In some electromagnetic surveys, the sources and receivers are towed through the water, possibly along with other equipment. The electromagnetic sources and receivers are sometimes towed in streamers, as described above for the seismic receivers.

Unfortunately, marine organisms adhere to nearly everything that moves through water for significant periods of time, including towed geophysical equipment. This adherence of marine organisms is known as "bio-fouling". Bio-fouling is conventionally conceived of in terms of barnacles, but also includes the growth of mussels, oysters, algae, tubeworms, slime, and other marine organisms.

Thus, a need exists for a system and a method for protecting towed geophysical equipment in marine geophysical surveys, especially towed streamers and equipment attached thereto, from bio-fouling. A need also exists for a system and method for reducing drag resistance on the towed geophysical equipment.

BRIEF SUMMARY OF THE INVENTION

The invention is a system and a method for gathering marine geophysical data. In one embodiment, the invention is a system comprising marine geophysical equipment, adapted for towing through a body of water, and a surface covering, comprising a textural attribute of shark skin, attached to the marine geophysical equipment. In another embodiment, the invention is a method comprising towing marine geophysical equipment having a surface covering, comprising a textural attribute of shark skin, attached thereto.

BRIEF DESCRIPTION OF THE DRAWINGS

The invention and its advantages may be more easily understood by reference to the following detailed description and the attached drawings, in which.

Figure 1:
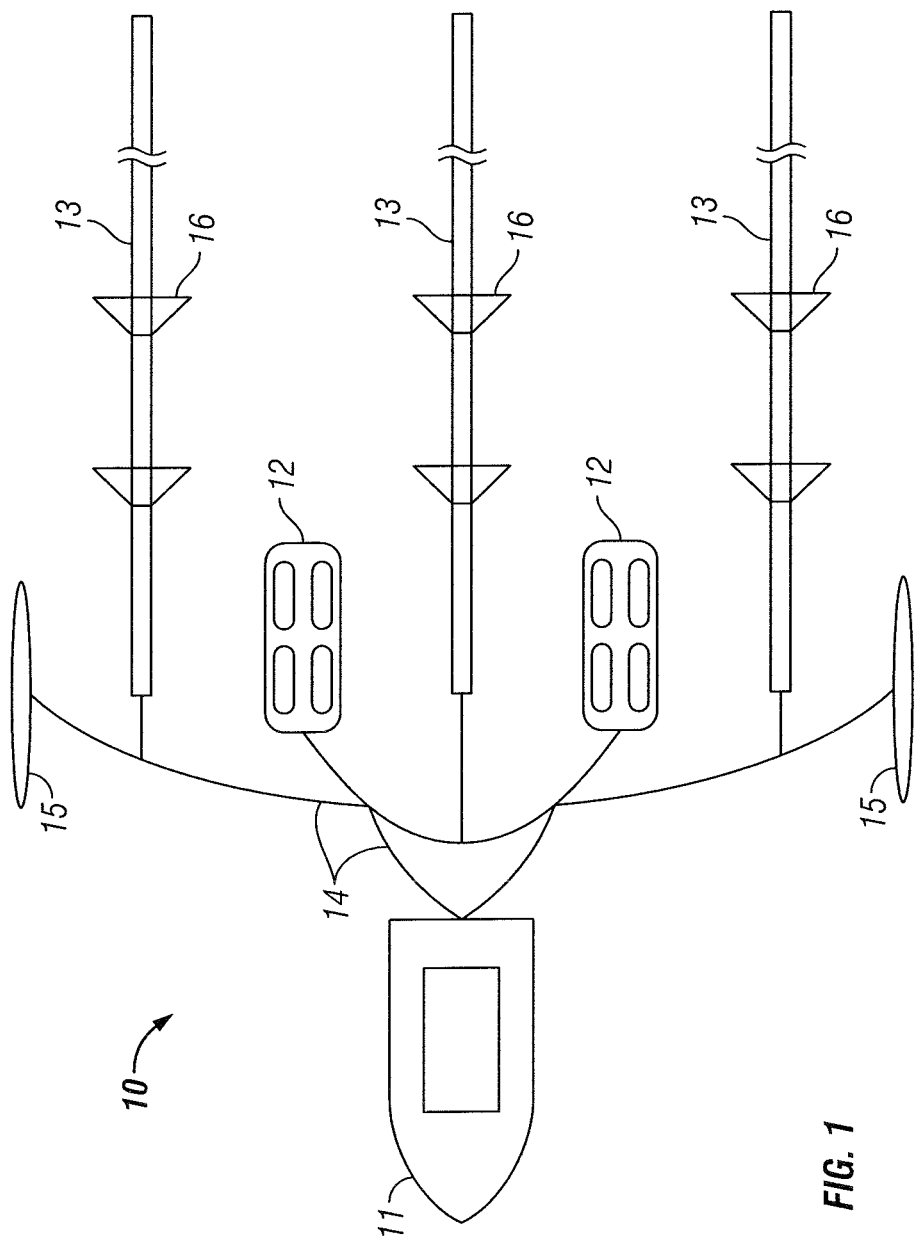
FIG. 1 is a schematic plan view of marine geophysical survey equipment used with towed streamers.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a system and a method for gathering marine geophysical data while protecting towed marine geophysical equipment from bio-fouling. Consequently, the invention is also a system and method for gathering marine geophysical data while reducing drag on the towed marine geophysical equipment. The following discussion of the invention will be illustrated in terms of towed streamers, but this is not a limitation of the invention. Any form of geophysical equipment that can and is towed through the water is considered appropriate for application of the present invention.

Sharks are one of the few creatures in the ocean that do not have other marine organisms adhering to them. Shark skin is not smooth, but has a rough, uneven texture. This rough texture prevents settlement of invertebrate larvae. Thus, inclusion of characteristic textural attributes of rough shark skin on the surface of towed streamer equipment, comprising streamer jackets along with all associated hardware and peripheral devices, will prevent or reduce invertebrate settlement in a similar way. In addition, a reduction in drag of streamers with jackets with this surface will occur when towed through the water.

Shark skin comprises tiny scales, embedded in the shark skin. The shark scales resemble tiny shark teeth in both appearance and structure, comprising an outer layer of enamel, dentine, and a central pulp cavity. These shark scales contain tiny spines or bristles that protrude from the scale surface to form tiny ridge-like structures parallel to the swimming direction. The area between these ridges further define tiny longitudinal grooves, which result in water moving more efficiently over the shark skin surface than it would if shark scales were smooth.

Over smooth surfaces, fast-moving water begins to break up into turbulent vortices, or eddies, in part because the water flowing at the surface of an object moves slower than water flowing further away from the object. This difference in water speed causes the faster water to form eddies. Over the rough shark skin surface, however, channeling the water through the grooves between the ridges decreases the friction of the water flowing along the shark's body. The grooves are so closely shaped that they prevent eddies from coming into contact with the surface of the shark's moving body, thus reducing the amount of drag.

Several factors appear to help prevent marine organisms from being able to adhere to shark skin. The rough surface texture of shark skin reduces the available surface area for marine organisms to adhere to. Marine organisms such as mussels and barnacles make some of the strongest natural adhesives known, but their glue can only penetrate so far into the rough surface of the shark scales, preventing them from sticking well. Additionally, the organisms cannot fit in the grooves and cannot balance on top of the ridges.

Still further, the accelerated water flow at a shark skin's surface reduces eddy formation, thereby reducing the contact time that potential fouling organisms have to adhere. The grooves reinforce the direction of flow by channeling it. Forcing water through the narrow grooves speeds up the slower water at the shark skin's surface. Conversely, the grooves pull faster water closer toward the shark's surface so that the faster water mixes with the slower water, reducing the speed differential. Finally, the grooves divide up the sheet of water flowing over the shark's surface so that any turbulence created results in smaller, rather than larger, vortices.

Using coverings, comprising a textural attribute of shark skin, for towed geophysical equipment will allow the equipment to be towed through the water with higher energy efficiency by auto-cleaning marine parasites from their surface and reducing friction drag. Reduction of bio-fouling will result in less production time lost to cleaning or replacing towed geophysical equipment, reduce work boat exposure hours, and reduce cable drag resulting in a reduction of fuel costs. Additionally, the reduced eddy formation at the equipment surfaces will lead to quieter towing, a great benefit in geophysical surveying.

Figure 2:
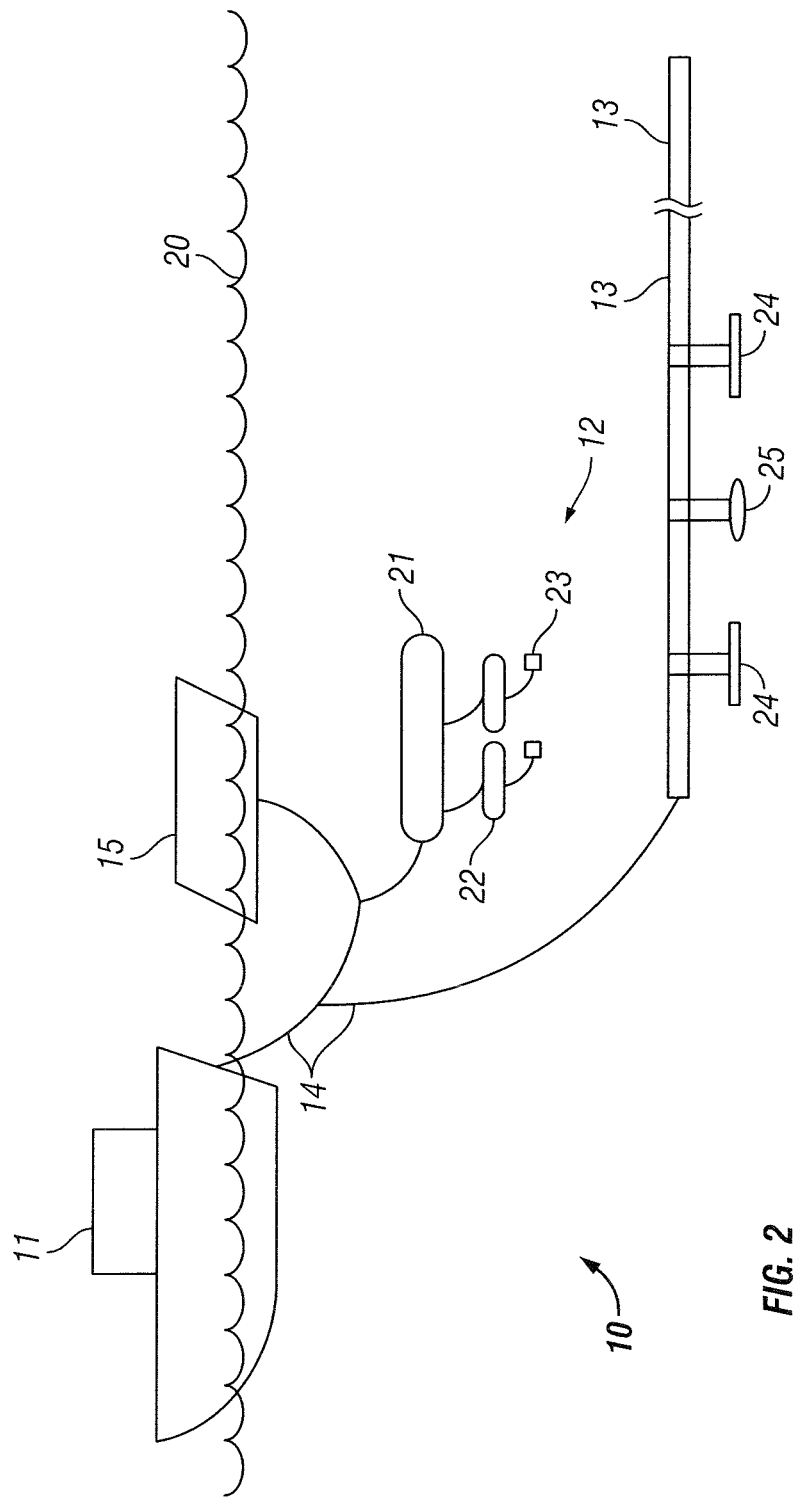
FIG. 2 is a schematic side view of marine geophysical survey equipment used with towed streamers.

FIGS. 1 and 2 show the typical types of towed marine geophysical equipment that can benefit by employment of various embodiments of the apparatus and method of the invention. FIG. 1 is a schematic plan view (not drawn to scale) of marine geophysical survey equipment that could be used with towed streamers. In this particular embodiment, the invention is illustrated by seismic streamers, receivers, and sources, but this is not a limitation of the invention. Any form of towed geophysical equipment, especially including electromagnetic streamers, receivers, and sources, is appropriate for use with the invention.

The towed marine geophysical equipment is generally designated by reference numeral 10. A seismic vessel 11 tows seismic sources 12 and seismic streamers 13. Although only two seismic sources 12 and three seismic streamers 13 are shown, this number is just for illustrative purposes only. Typically, there can be more seismic sources 12 and many more seismic streamers 13. The seismic sources 12 and the seismic streamers 13 are connected to the seismic vessel 11 by cables 14. The cables 14 are typically further connected to devices such as deflectors 15 that spread apart the seismic streamers 13. FIG. 1 shows that the seismic streamers 13 may have equipment attached inline or around the streamers 13. The attached equipment can be, by way of example, in-line mounted position control devices 16, such as depth control devices or lateral control devices, as well as acoustic units and retriever units (not shown). The attached equipment also can be, by way of example, sensors of various types, such as depth sensors.

FIG. 2 is a schematic side view (not drawn to scale) of marine geophysical survey equipment, including towed streamers. The side view in FIG. 2 corresponds to the plan view of the towed marine geophysical equipment shown in FIG. 1.

The seismic vessel 11 tows seismic sources 12 and seismic streamers 13 under the water surface 20. The seismic sources 12 primarily comprise floats 21 and air guns 22, but may also have equipment such as, for example, near-field sensors (hydrophones) 23 attached adjacent the air guns 22. FIG. 2 shows that the seismic streamers 13 may have additional equipment attached below the streamers 13. The attached equipment can be, by way of example, suspended position control devices 24 and suspended sensors 25, as well as acoustic units and retriever units (not shown).

Figure 3:
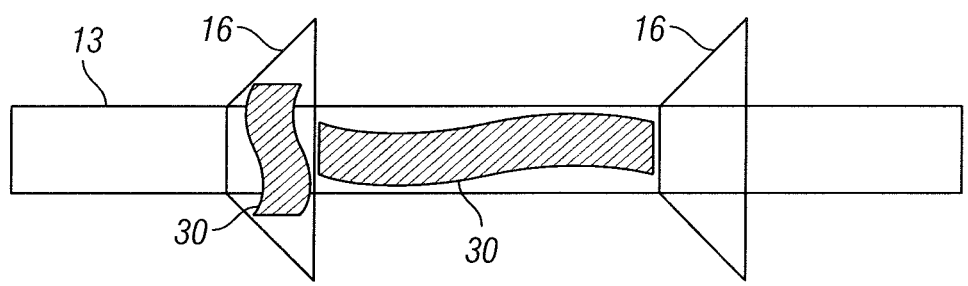
FIG. 3 is a schematic plan view of geophysical equipment attached to a streamer.
Figure 4:
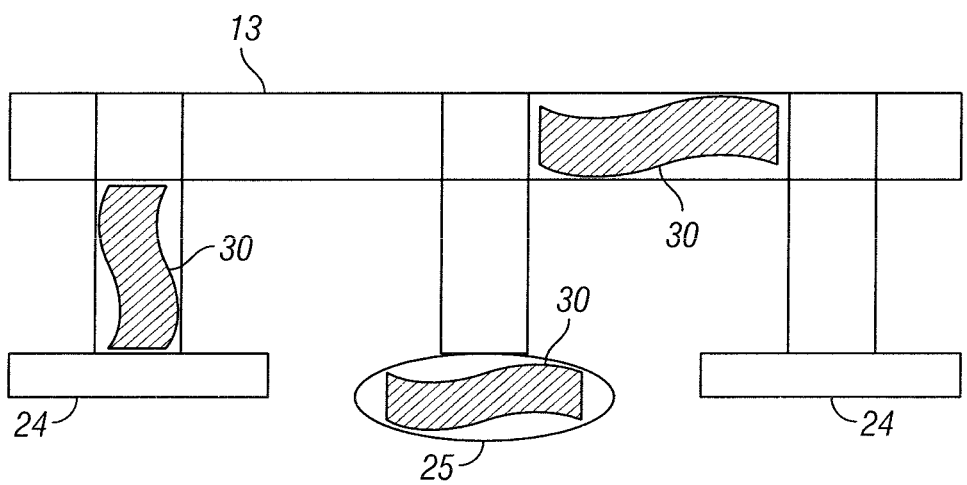
FIG. 4 is a schematic side view of geophysical equipment attached under a streamer.

FIGS. 3 and 4 show close-up views of the seismic equipment attached to the seismic streamer in FIGS. 1 and 2, respectively. FIG. 3 is a schematic plan view (not drawn to scale) of seismic equipment attached to a seismic streamer.

Surface coverings 30, comprising a textural attribute of shark skin, are attached to the towed marine seismic equipment 10. The surface coverings 30 are described in more detail in FIGS. 5 to 8, below. In one embodiment, the surface covering 30 is shown covering a portion of the inline position control devices 16 or the seismic streamer 13. These configurations of the surface covering 30 shown here in FIGS. 3 and 4 are for illustrative purposes only and are not meant to limit the invention. The surface covering 30 of the invention can be configured in any appropriate manner and attached in any appropriate manner to any appropriate portion of the towed marine seismic equipment 10.

FIG. 4 is a schematic side view (not drawn to scale) of seismic equipment attached under a seismic streamer. As in FIG. 3 above, the surface covering 30 is shown attached to the towed marine seismic equipment 10. The surface coverings 30 are shown attached to appropriate portions of the suspended position control devices 24, suspended sensors 25 or seismic streamers 13. Other configurations of the surface covering 30 are possible and compatible with the invention.

The surface coverings 30 of the invention include, but are not limited to, coverings attached to the surface of the equipment 10, coatings applied to the surface of the equipment 10, and modifications made to the surface of the equipment 10.

Figure 5:
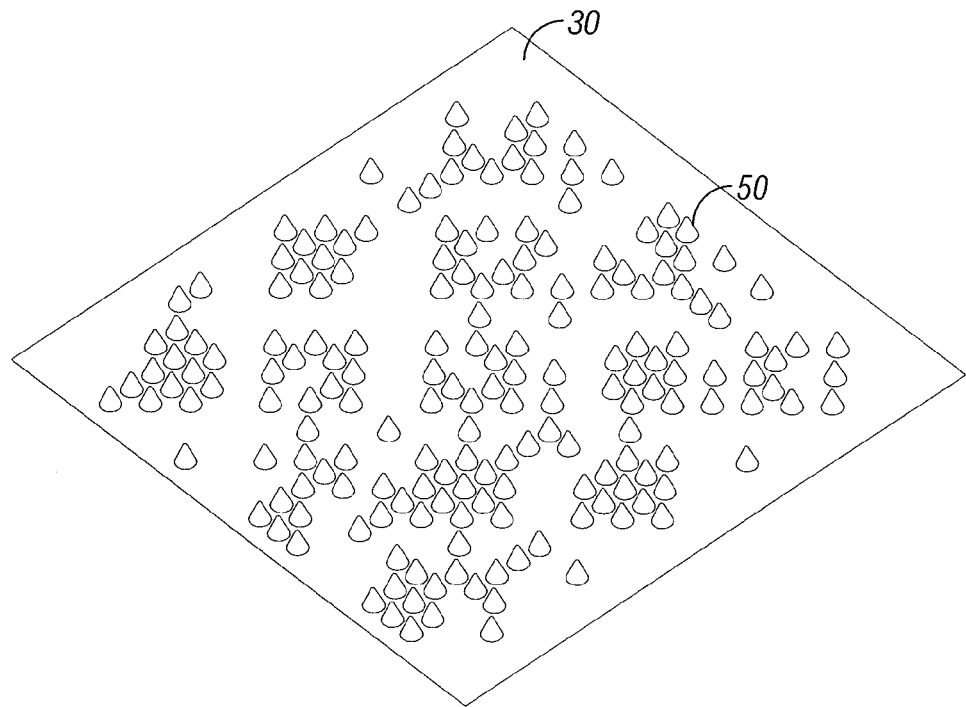
FIG. 5 is a schematic perspective view of an embodiment of a surface covering of the invention.
Figure 6:
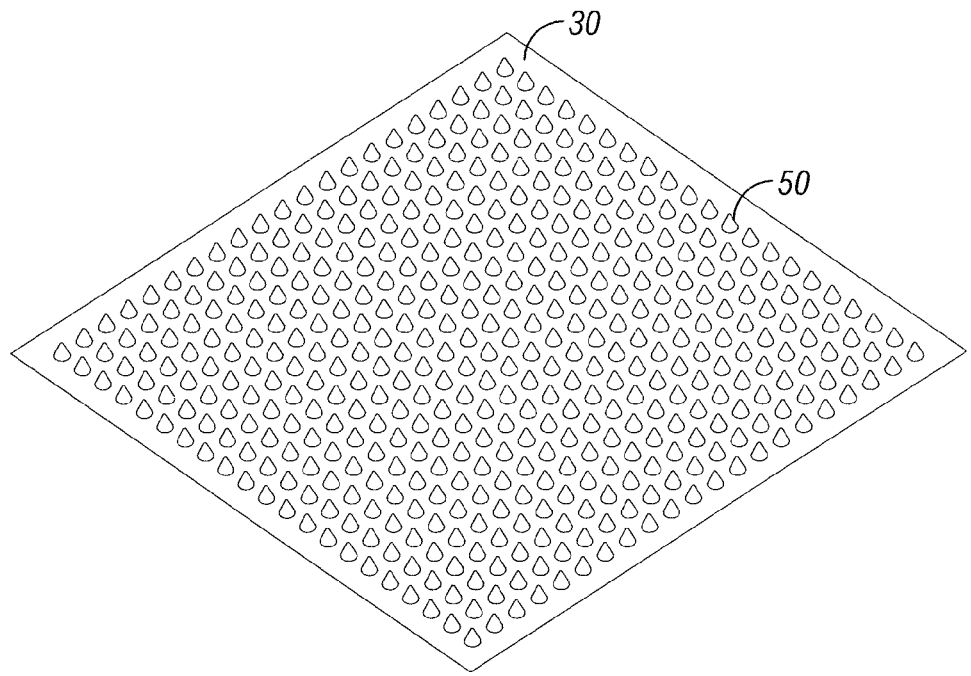
FIG. 6 is a schematic perspective view of an embodiment of a surface covering of the invention.
Figure 7:
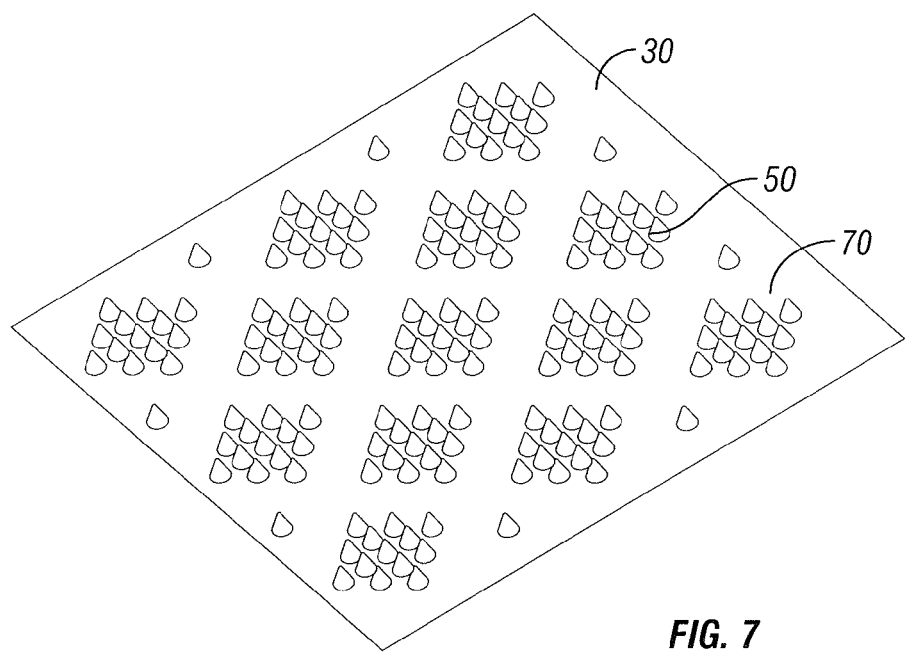
FIG. 7 is a schematic perspective view of an embodiment of a surface covering of the invention.

FIGS. 5 to 8 show various embodiments of the surface coverings of the invention that comprise shark skin textures. A surface covering 30 is shown with surface elements 50 embedded. FIGS. 5 to 7 are schematic perspective views of embodiments of surface coverings of the invention. In each of FIGS. 5 to 7, the pattern of surface elements 50 embedded in the surface covering 30 is designed to comprise textural attributes of shark skin that contribute to prevention of bio-fouling and reduction of drag.

In FIG. 5, the surface elements 50 are arranged in a random pattern on the surface covering 30. In this embodiment, the random pattern of surface elements 50 displayed provides an undulating surface texture to the surface covering 30. This uneven texture results in an ability to prevent marine organisms from adhering. In FIG. 6, the surface elements 50 are arranged in a regular, fully populated pattern on the surface covering 30. In this embodiment, the texture on the surface covering 30 resulting from the regular pattern of surface elements 50 replicates the dimensions of the scales on shark skin. This textural attribute also replicates the shark skin's ability to prevent marine organisms from adhering. It is anticipated that the embodiments shown in FIG. 5 and FIG. 6 will also, to some extent, reduce drag resistance. In FIG. 7, the surface elements 50 are arranged in a regular diamond pattern on the surface covering 30. The diamond shaped clusters 70 of surface elements 50 replicate the dimensioning, size, and shape of scales on shark skin. The pattern of diamond shaped clusters 70 of surface elements 50 replicates the scaled texture of shark skin and this textural attribute replicates shark skin's ability to reduce bio-fouling and drag resistance.

The textural attributes from the particular patterns of surface elements 50 and resulting textures of the surface coverings 30 illustrated in FIGS. 5 to 7 are not intended to be limitations of the invention. Any textural pattern that comprises a textural attribute of shark skin is an appropriate embodiment of the invention.

Figure 8:
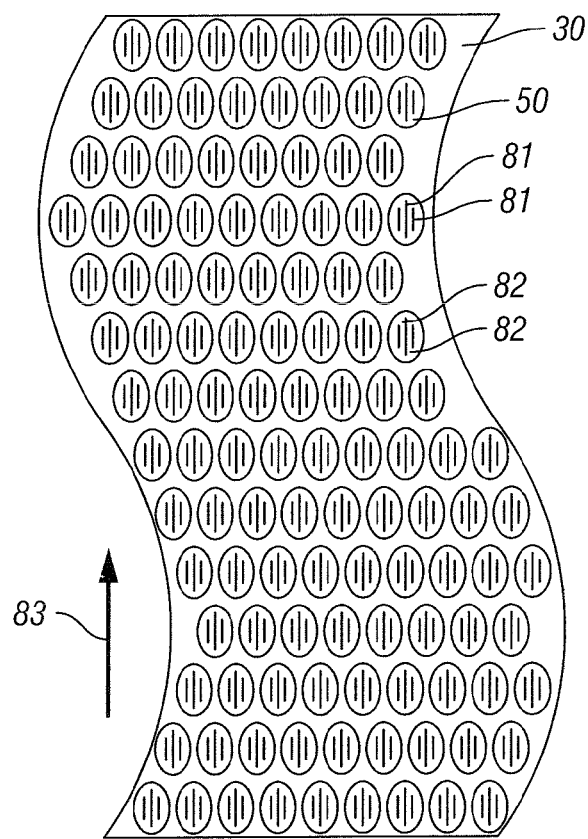
FIG. 8 is a schematic plan view of another embodiment of a surface covering of the invention.

FIG. 8 is a schematic plan view of another embodiment of a surface covering of the invention. In this embodiment, the surface elements 50 covering the surface covering 30 are more particularly designed to replicate the textural attribute of shark skin scales. The surface elements 50 themselves are dimensioned and positioned to replicate the size and spacing of the scales in shark skin. Thus, the pattern of surface elements 50 in FIG. 8 replicates the textural attribute of scaled shark skin. In a further embodiment, the surface elements 50 additionally have parallel ridges 81, with accompanying parallel groves 82. The ridges 81 and grooves 82 are dimensioned and positioned to replicate the size and spacing of the ridges and grooves on the scales on shark skin, more closely replicating the textural attributes of shark skin texture. By appropriate attachment of the surface covering 30 to the equipment 10 (shown in FIGS. 3 and 4), the ridges 81 and grooves 82 are arranged to be aligned generally parallel to the direction of water flow, designated by arrow 83. Thus, this textural attribute replicates the shark skin's ability to reduce bio-fouling and drag resistance.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. Marine geophysical equipment, comprising a surface covering that comprises surface elements, wherein the surface elements replicate a textural attribute configured to reduce bio-fouling, wherein the surface elements are arranged in a random pattern on the surface covering to provide an undulating surface texture to the surface covering.

2. The equipment of claim 1, wherein the marine geophysical equipment comprises at least one device selected from the group consisting of: a marine seismic source, a marine electromagnetic receiver, a marine electromagnetic source, and any combination thereof.

3. The equipment of claim 1, wherein the surface covering comprises a modification of a surface of the marine geophysical equipment.

4. The equipment of claim 1, wherein the surface covering fully covers the marine geophysical equipment.

5. The equipment of claim 1, wherein the surface covering comprises a coating applied to a surface of the marine geophysical equipment.

6. The equipment of claim 5, wherein the coating fully coats the surface of the marine geophysical equipment.

7. The equipment of claim 1, wherein either the surface elements or the pattern of surface elements replicate the dimensions of scales on shark skin.

8. The equipment of claim 1, wherein the surface elements further comprise parallel ridges and grooves.

9. A method for gathering marine geophysical data, comprising:
    adapting a surface of marine geophysical equipment so that the surface comprises a surface covering that comprises surface elements, wherein the surface elements replicate a textural attribute configured to reduce bio-fouling, wherein the surface elements are arranged in a random pattern on the surface covering to provide an undulating surface texture to the surface covering; and
    towing the marine geophysical equipment through a body of water.

10. The method of claim 9, wherein the marine geophysical equipment comprises at least one device selected from the group consisting of: a marine seismic source, a marine electromagnetic receiver, a marine electromagnetic source, and any combination thereof.

11. The method of claim 9, wherein the surface covering comprises a modification of a surface of the marine geophysical equipment.

12. The method of claim 9, wherein the surface covering fully covers the marine geophysical equipment.

13. The method of claim 9, wherein the surface covering comprises a coating applied to a surface of the marine geophysical equipment.

14. The method of claim 9, wherein the surface covering comprises surface elements in a pattern providing a textural attribute of an uneven surface texture.

15. The method of claim 14, wherein either the surface elements or the pattern of surface elements replicate the dimensions of scales on shark skin.

16. The method of claim 14, wherein the surface elements further comprise parallel ridges and grooves.

17. The method of claim 9, wherein the marine geophysical equipment is an inline position control device.

18. Marine geophysical equipment, comprising a surface covering comprising surface elements in a pattern to reduce bio-fouling, wherein the surface elements are arranged in a random pattern to provide an undulating surface and texture on the surface covering, and wherein the marine geophysical equipment is an inline position control device.

\* \* \* \* \*